(12) United States Patent
Schmidt et al.

(10) Patent No.: US 8,839,116 B2
(45) Date of Patent: Sep. 16, 2014

(54) USER INTERFACE IN AN INFORMATION TECHNOLOGY (IT) SYSTEM

(75) Inventors: Sebastian Schmidt, Weisendorf (DE); Katharina Socher, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 529 days.

(21) Appl. No.: 12/541,537

(22) Filed: Aug. 14, 2009

(65) Prior Publication Data

US 2010/0049743 A1 Feb. 25, 2010

Related U.S. Application Data

(60) Provisional application No. 61/090,914, filed on Aug. 22, 2008.

(51) Int. Cl.
*G06F 3/00* (2006.01)
*G06F 11/22* (2006.01)

(52) U.S. Cl.
CPC .................................. *G06F 11/2294* (2013.01)
USPC ........................ 715/740; 715/704; 715/750

(58) Field of Classification Search
CPC . G06F 9/4445; G06F 9/4446; G06F 11/2294; H04L 67/025
USPC ................................................. 715/704, 740
See application file for complete search history.

(56) References Cited

U.S. PATENT DOCUMENTS

| | | | |
|---|---|---|---|
| 5,072,412 A | 12/1991 | Henderson, Jr. et al. | |
| 5,917,929 A | 6/1999 | Marshall et al. | |
| 6,384,843 B1* | 5/2002 | Harel | 715/762 |
| 6,734,880 B2 | 5/2004 | Chang et al. | |
| 2004/0095383 A1* | 5/2004 | Pfeifer et al. | 345/745 |
| 2004/0123129 A1* | 6/2004 | Ginter et al. | 713/193 |
| 2004/0143594 A1* | 7/2004 | Kalies | 707/103 R |
| 2005/0190769 A1* | 9/2005 | Smith | 370/395.2 |
| 2005/0278630 A1* | 12/2005 | Bracey | 715/704 |
| 2005/0278728 A1* | 12/2005 | Klementiev | 719/328 |
| 2006/0242638 A1* | 10/2006 | Lew et al. | 717/168 |
| 2008/0126931 A1* | 5/2008 | Kojima et al. | 715/704 |
| 2009/0112629 A1* | 4/2009 | Leiper | 705/3 |
| 2009/0276728 A1* | 11/2009 | Doan et al. | 715/810 |
| 2009/0300510 A1* | 12/2009 | Gantman et al. | 715/740 |
| 2010/0095208 A1* | 4/2010 | White et al. | 715/704 |
| 2010/0229112 A1* | 9/2010 | Ergan et al. | 715/764 |

OTHER PUBLICATIONS

"Device—Definition and More from the Free Merriam-Webster Dictionary", retrieved from http://www.merriam-webster.com/dictionary/device on Feb. 6, 2012, Merriam-Webster, p. 1.*
"Microsoft Computer Dictionary", Mar. 15, 2002, Microsoft Press, Fifth Edition, p. 639.*

* cited by examiner

*Primary Examiner* — Kieu Vu
*Assistant Examiner* — Aaron Lowenberger
(74) *Attorney, Agent, or Firm* — Lempia Summerfield Katz LLC

(57) ABSTRACT

A method and system for improving user interfaces in IT systems is provided. In one embodiment, the method includes using a remote maintenance function by a user of a user interface in order to allow a technician to take control of a data transmission connection during operation, recording interactions implemented during the use of the remote maintenance function in a database of the manufacturer of the IT system and evaluating the recorded interactions by the manufacturer in order to derive therefrom indications of an improvement in the user interface.

19 Claims, 1 Drawing Sheet

USER INTERFACE IN AN INFORMATION TECHNOLOGY (IT) SYSTEM

The present patent document claims the benefit of the filing date of U.S. Provisional Application No. 61/090,914, which was filed Aug. 22, 2008, and is incorporated by reference.

BACKGROUND

Intuitive usability is important for customers of complex medical devices. It is difficult for the manufacturer to differentiate basic technologies purely by technologies. The number of devices in hospitals is growing continuously so that increasingly less time remains to train users. Furthermore, user interfaces become more complex as the number of features and applications increases.

This is particularly noticeable within the field of medical imaging devices. "Traditional" film-based x-ray devices had very few adjustment possibilities. However, nowadays, digital, computer-controlled devices, which offer very complex adjustment possibilities, are standard. It is difficult for manufacturers to optimize the operability since there is a lack of corresponding information for the developer. Operating errors are not detected by the manufacturer and adjustments to the device, which could in future prevent operating errors, do not take place. With other products outside the field of medicine, the problem of the ever increasing complexity of the user interfaces is apparent. It is also difficult for the manufacturer to optimize the usability of the user interfaces since an information flow based on the general usability seldom takes place, with mainly the acute problems being discussed and solved.

Device and user interface prototypes are generated and tested with carefully selected trial customers. This procedure is disadvantageous in that the selected customers are often not representative because they indicate a high affinity (i.e., have a close relationship) to the manufacturer and are already accustomed to the manufacturer's systems.

SUMMARY AND DESCRIPTION

The present embodiments may obviate one or more of the problems or drawbacks inherent in the related art. It is the object of the invention to improve this situation.

In one embodiment, a method for remotely controlling and supporting complex devices, e.g. medical devices with a user interface, is extended to such a degree that the interactions implemented during the session are archived separately in a database. The database is accessible to the manufacturer of the system and is used to identify typical user errors or problems. A system and/or method may be used to collect representative data, which relates to problem situations, during operation of the software.

Functions relating to the remote control of medical systems may be used. One example is the product "syngo Expert" by Siemens. A user of a system is able to call a supporting technician ("supporter") for help. Once a session has been started, both participants view the same screen content on their computer screens and both are able to control the system using a keyboard and mouse click. Some systems of this type offer the possibility of recording the session as "film".

The support is extended such that during the session, data relating to the behavior of a local user and supporter is recorded and written into a database. The database is finally evaluated by the manufacturer of the device. In one embodiment, with each mouse click, the coordinates of the mouse pointer and the "clicking" user may be stored. In another embodiment, the selected menu item may be stored with each selection of a menu item. In yet another embodiment, the name of the application may be stored with each start of an application. In yet another embodiment, a film may be recorded, and subsequently evaluated automatically, for example, by the mouse pointer being identified and the coordinates being written into the database.

The database is in this case accessible to the manufacturer of the system and detects a plurality (e.g., ranging from hundreds to thousands) of support sessions and users. The database is subsequently analyzed in order to identify frequent patterns. The patterns may be screen areas (e.g., coordinate ranges), which are particularly frequently "clicked" during the support session. The information is then used to identify user problems in this region and to take them into consideration during additional product development.

In one example, an evaluation indicates that in the case of a large number of support sessions, the supporter clicks into a certain area on the screen, at which a push button is located in order to carry out a certain setting. It is possible to conclude herefrom that these settings form the object of the support requests and require improvement.

The stored actions may be stored without context-sensitive or customer-specific data, e.g. patient data, by only the coordinates of the mouse click and not the screen contents being stored, and/or the displayed screen contents are deleted again after evaluation. The recordings can be anonymized, with respect to the customer, in order to take account data protection issues. The data determined is used to assess the development efficiency (e.g. by the number of support actions for a sub application being evaluated before and after a further development).

The invention is advantageous in that the manufacturer of the information technology (IT) system obtains statistically significant data relating to typical user problems and is able to take account the data in the development and to use the development resources in a targeted fashion.

An additional advantage results compared with existing methods such as e.g. so-called "Focus Groups" in that the data determined relates to the overall installed base and is collected in a realistic user situation and not in a lab situation.

DETAILED DESCRIPTION

Figure 1:
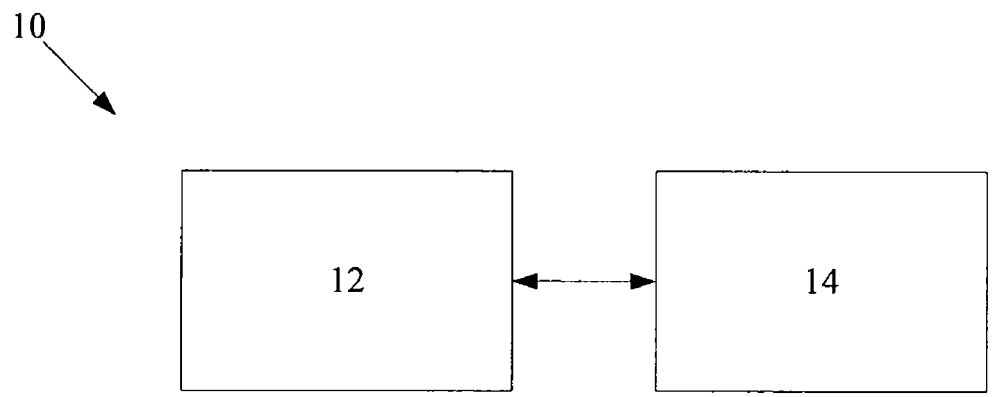
FIG. 1 illustrates one embodiment of an information technology system.

FIG. 1 illustrates one embodiment of an information technology system 10. The system includes a control unit 12 and a database 14. A user may use the control unit 12 to operate a remote maintenance function of a user interface to allow a technician to take control of a data transmission connection during operation. The control unit 12 may record interactions implemented during the use of the remote maintenance function. The control unit 12 may store the interactions in the database 14 of the manufacturer of the IT system. The control unit 12 may evaluate the recorded interactions in order to derive indications of an improvement in the user interface.

Figure 2:
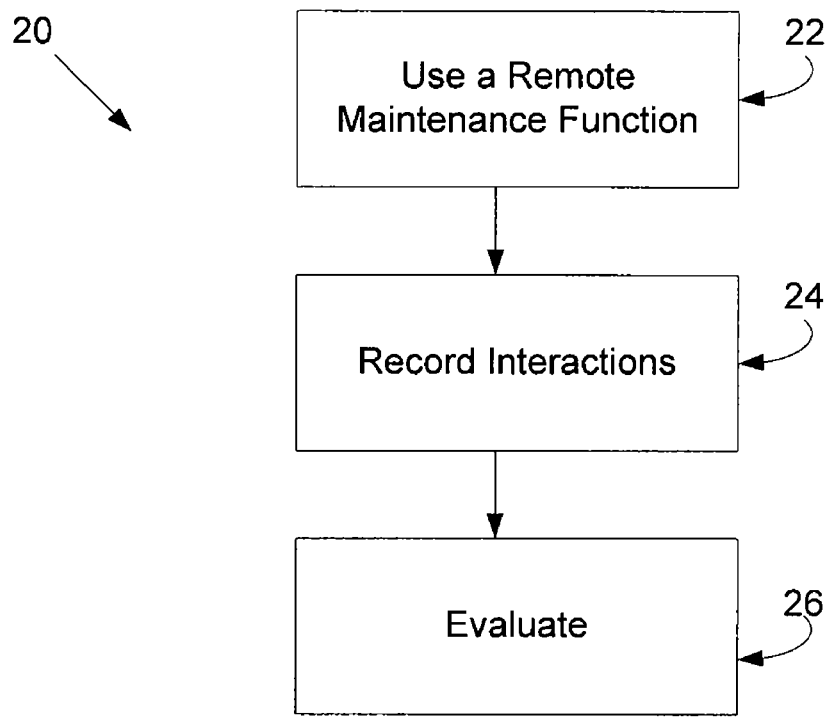
FIG. 2 illustrates one embodiment of improving the development of a user interface.

FIG. 2 illustrates one embodiment of a method 20 of improving the development of a user interface. The method may include using a remote maintenance function by a user of a user interface in order to allow a technician to take control of a data transmission connection during operation (act 22), recording interactions implemented during the use of the remote maintenance function in a database of the manufacturer of the IT system (act 24) and evaluating the recorded interactions by the manufacturer in order to derive t indications of an improvement in the user interface using the recorded data (act 26).

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A method for improving user interfaces in information technology (IT) systems, the method comprising:
   using a remote maintenance function by a user of a user interface in order to allow a technician to take control of a data transmission connection during operation and to provide that screen content viewed by the user is the same as screen content viewed by the technician;
   recording interactions involving the technician and the user interface during the use of the remote maintenance function in a database of a manufacturer of the IT system, the recorded interactions comprising screen contents;
   identifying one or more errors or problems in the user interface based on an evaluation of the recorded interactions involving the technician and the user interface;
   deriving, based on the identified one or more problems or errors in the user interface, indications of an improvement in the user interface; and
   deleting the recorded screen contents after the evaluation, such that actions are stored without context-sensitive or customer-specific data.

2. The method as claimed in claim 1, wherein recording interactions includes storing coordinates of a mouse click of a mouse pointer and an identity of a user controlling a mouse when the mouse is used as an input device to interact with the user interface.

3. The method as claimed in claim 1, further comprising:
   selecting one or more menu items; and
   storing each selected menu item of the one or more selected menu items.

4. The method as claimed in claim 1, further comprising storing a name of an application in the database of the manufacturer of the IT system upon a start of the application.

5. The method as claimed in claim 1, further comprising recording a control sequence and automatically evaluating the control sequence after the recording.

6. The method as claimed in claim 1, wherein recording interactions includes storing coordinates of a mouse click of a mouse pointer and an identity of a user controlling a mouse when the mouse is used as an input device to interact with the user interface, the method further comprising identifying the mouse pointer and writing coordinates of the mouse pointer into the database.

7. The method as claimed in claim 1, further comprising storing the interactions without context-sensitive or customer-specific data by only storing coordinates of a mouse click.

8. The method as claimed in claim 5, wherein the recording is anonymized with respect to a customer.

9. An information technology (IT) system comprising:
   a computer configured to:
      use a remote maintenance function by a user of a user interface to allow a technician to take control of a data transmission connection during operation;
      record interactions involving the technician and the user interface during the use of the remote maintenance function in a database associated with a manufacturer of the IT system;
      identify one or more errors or problems in the user interface based on an evaluation of the recorded interactions involving the technician and the user interface; and
      derive indications of an improvement in the user interface based on the identified one or more errors or problems in the user interface,
   wherein the recorded interactions comprise screen contents, and
   wherein the computer is configured to delete the recorded screen contents after the evaluation, such that actions are stored without context-sensitive or customer-specific data.

10. The IT system of claim 9, wherein the computer is operable to store a menu item when the menu item is selected.

11. The IT system of claim 9, wherein the computer is operable to store a name of an application in the database associated with the manufacturer of the IT system upon a start of the application.

12. The IT system of claim 9, wherein the computer is operable to record a control sequence and automatically evaluate the control sequence after the recording.

13. The IT system of claim 9, wherein the computer is operable to identify a mouse pointer and write coordinates of the mouse pointer into the database.

14. The IT system of claim 9, wherein the computer is operable to store only coordinates of a mouse click, such that the interactions are stored without context-sensitive or customer-specific data.

15. The IT system of claim 9, wherein the computer is operable to anonymize the recorded interactions with respect to a customer, such that data protection issues are taken-account of.

16. The method as claimed in claim 1, further comprising identifying patterns based on the recorded interactions, the patterns being indicative of screen areas or coordinate ranges frequently selected during the remote maintenance function.

17. The method as claimed in claim 1, wherein recording interactions comprises recording interactions between the technician and the user interface during the use of the remote maintenance function in the database of the manufacturer of the IT system.

18. The method as claimed in claim 1, wherein recording interactions comprises recording interactions between the technician and the user interface and between the user and the user interface during the use of the remote maintenance function in the database of the manufacturer of the IT system.

19. A method for improving user interfaces in information technology (IT) systems, the method comprising:
   initiating, with a controller of a first computer, a remote maintenance function of a user interface of the first computer to allow a technician at a second computer to take control of a data transmission connection during operation and to provide that screen content viewed by a user at the first computer is the same as screen content viewed by the technician at the second computer;
   recording interactions involving the technician and the user interface during the use of the remote maintenance function in a database of a manufacturer of the IT system, the recorded interactions comprising screen contents;

identifying one or more errors or problems in the user interface based on an evaluation of the recorded interactions involving the technician and the user interface;

deriving, based on the identified one or more problems or errors in the user interface, indications of an improvement in the user interface; and deleting the recorded screen contents after the evaluation, such that actions are stored without context-sensitive or customer-specific data.

* * * * *